United States Patent [19]

Farkas

[11] Patent Number: 4,614,056
[45] Date of Patent: Sep. 30, 1986

[54] STACKING PLANTERS

[75] Inventor: Frank Farkas, Concord, Canada

[73] Assignee: F.F. Plastics R.D. Inc., Concord, Canada

[21] Appl. No.: 693,335

[22] Filed: Jan. 22, 1985

[51] Int. Cl.⁴ .............................................. A01G 9/02
[52] U.S. Cl. ........................................ 47/67; 47/82; 47/83
[58] Field of Search .................. 47/67, 71, 82, 83, 86; 403/348, 349; 220/4 C, 4 D; 446/71, 117

[56] References Cited

U.S. PATENT DOCUMENTS

| 3,389,499 | 6/1968 | Haile | 47/83 |
| 3,555,729 | 1/1971 | Chute | 47/81 |
| 3,686,791 | 8/1972 | Mills | 47/83 |
| 3,990,179 | 11/1976 | Johnson et al. | 47/67 |
| 4,369,598 | 1/1983 | Beckwith | 47/81 |

FOREIGN PATENT DOCUMENTS 231444  3/1944  Switzerland .......................... 47/82

Primary Examiner—Robert A. Hafer
Assistant Examiner—Bradley M. Lewis

[57] ABSTRACT

The present invention provides a planter which is vertically stackable and interlockable with further like planters. The planter includes a lower end which is interlockable with a first like planter from beneath and an upper end which is interlockable from above with a second like planter. The upper end of the planter is further provided with a planting region remote from the interlocking region between planters and exposed beneath the second like planter positioned above the planting region.

6 Claims, 6 Drawing Figures

STACKING PLANTERS

FIELD OF THE INVENTION

The present invention relates to a stackable planter which is interlockable from both below and above with further like planters and includes at least one planting region at its upper end which remains exposed when interlocked with such further like planters.

BACKGROUND OF THE PRESENT INVENTION

The use of potted plants and flowers for decorating both home and office has become increasingly popular. One particularly useful arrangement is in the form of a hanging planter; however, the typical conventional hanging planter is usually limited in space and is not compatible for use with additional planters. The same is true for most non-hanging planters which are not generally stackable so that they must be located separately from one another tending to occupy substantial amounts of floor space.

SUMMARY OF THE PRESENT INVENTION

The present invention provides a planter which is vertically stackable and interlockable with further like planters. The planter, according to the present invention includes a lower end provided with first interlocking means for interlocking with a first like planter therebelow and having an upper end provided with both second interlocking means and at least one planting region remote from the second interlocking means in a position to provide exposure of the planting region when interlocked with the second like planter from above.

The planter, according to the present invention is particularly suitable for use in a hanging position where further planters can easily be added, according to the amount of planting space required. The same applies for ground located planters which, according to the present invention, are vertically stackable and interlockable with one another to minimize the amount of floor space required while substantially increasing planting area.

BRIEF DISCUSSION OF THE DRAWINGS

The above, as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
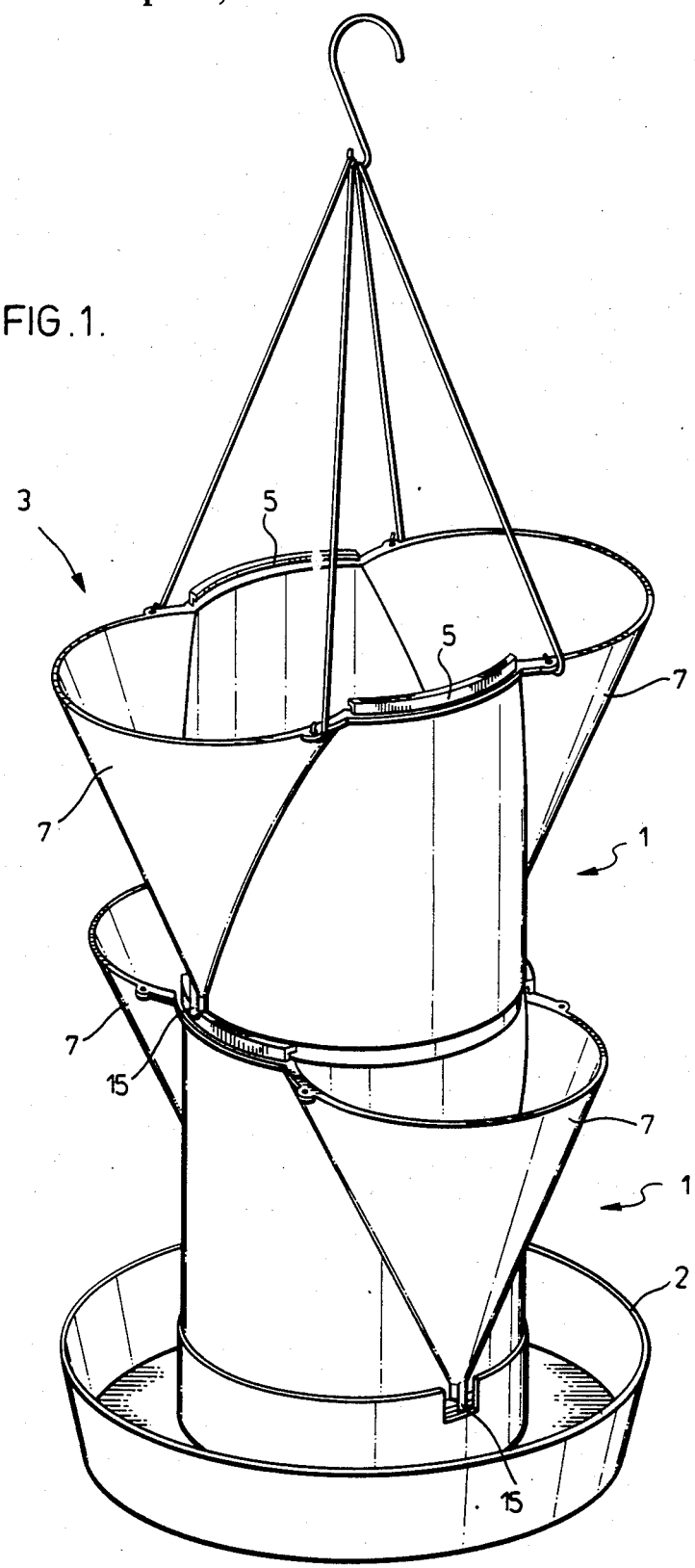
FIG. 1 is a top perspective view of a stacked interlocking hanging planter arrangement according to a preferred embodiment of the present invention.

FIG. 1 shows a pair of interlocking planters 1 in a vertically stacked position. These planters are identical with one another and as such, the reference numerals are the same for both the upper and lower planters shown in FIG. 1.

Figure 2:
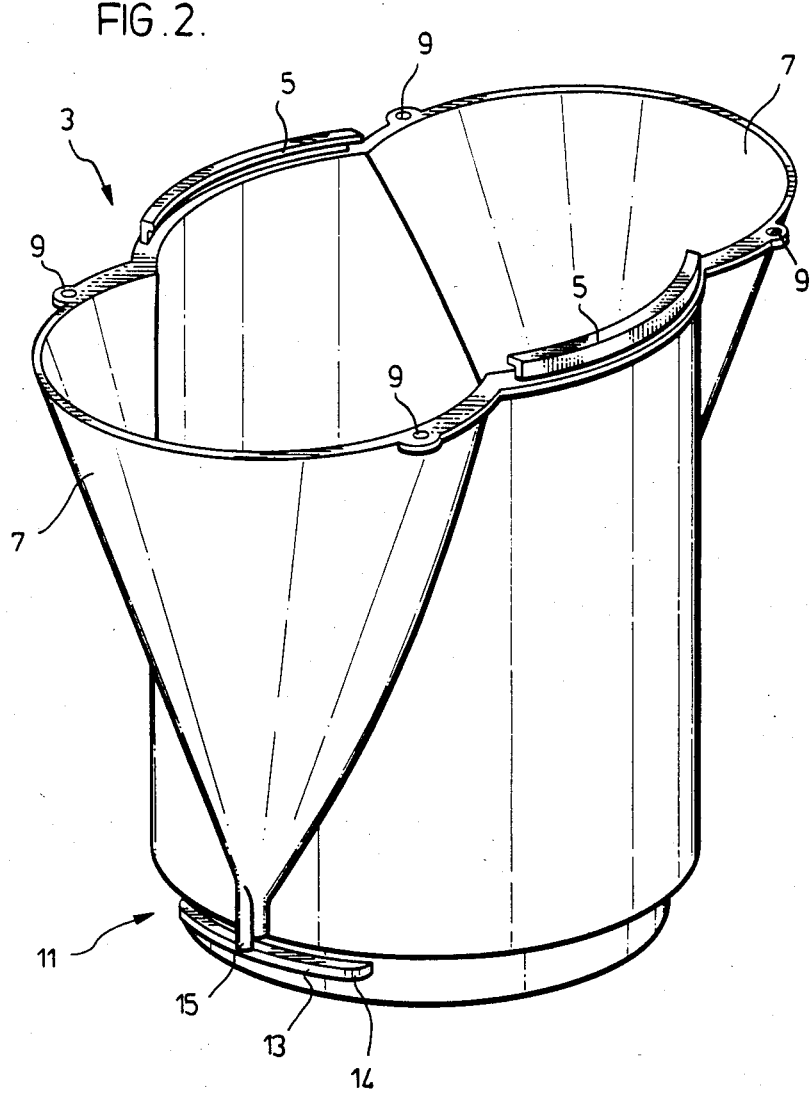
FIG. 2 is a top perspective view of an individual planter from the arrangement of FIG. 1.

Each of the planters comprises an upper end generally indicated at 3, and a lower end generally indicated at 11 and best seen in FIG. 2.

The upper end of the planter includes a pair of undercut portions 5 at opposite sides of the planter as well as a pair of semi-conical planting regions 7, diametrically opposed from one another and circumferentially spaced from the undercut portions 5.

The lower end of the planter includes a pair of ribs 13, again diametrically opposed from one another, and located immediately beneath the planting region at the upper end of the planter. In the embodiment shown in FIGS. 1 through 4, ribs 13 are offset or circumferentially spaced by about 90 degrees around the perimeter of the planter from undercut portion 5 at the upper end of the planter.

Figure 3:
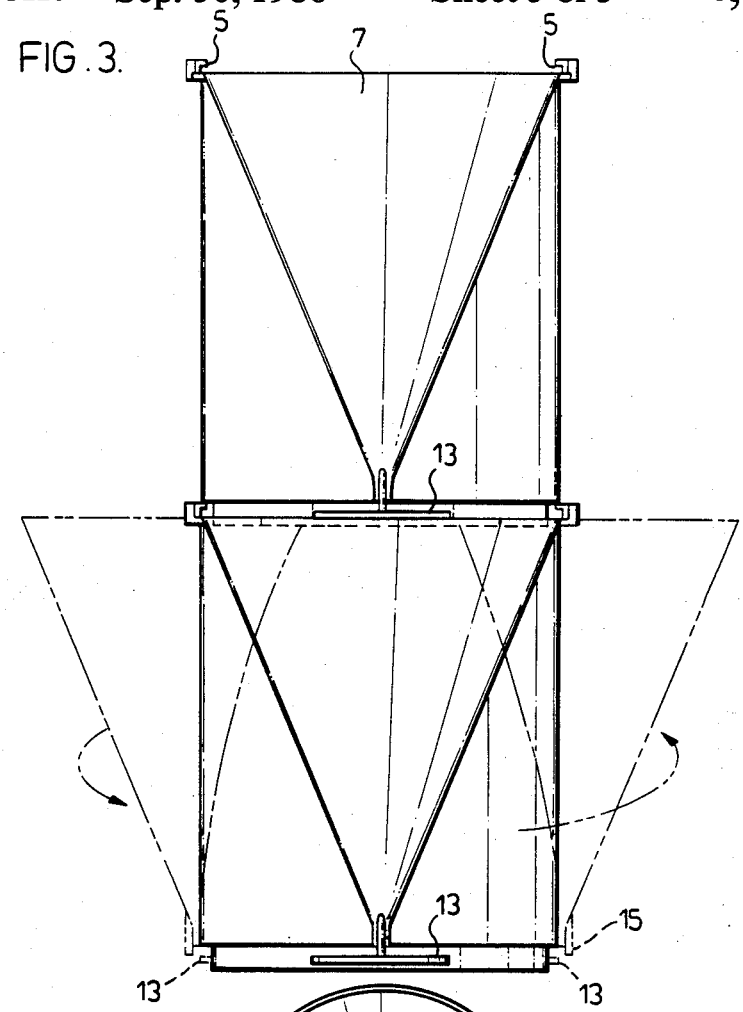
FIG. 3 is a side view showing the interlocking action between the upper and lower planters.

Also provided at the lower end of the planter is a small downwardly depending lug 15, spaced outwardly from rib 13, as best seen in the lower planter of FIG. 3.

Provided interiorly of each of the planters are a plurality of drain holes 17. These drain holes provide a continuous drain through each of the stacked planters to a bottom located dish 2 frictionally engaged at the bottom end of the lower planter shown in the arrangement of FIG. 1. Provided at the upper end of each planter are a plurality of eyelets 9, used with a suspension arrangement as shown in FIG. 1 for hanging of the planter arrangement.

From a construction standpoint, each of the planters, as well as the bottom dish, is preferably made in a molding operation from a lightweight, high grade plastic material of various different colours. The plastic material reduces the weight of the arrangement while being extremely rugged for providing interlocking support in both the hanging, as well as the floor stacked mode.

A prime feature of the present invention is that when two or more planters are vertically stacked with one another, the planting regions on the lower planter remain exposed beneath the planter located thereabove. This is a result of the positioning of the planting regions away from, or remotely of, the interlocking means at the upper end of each planter. Accordingly, the interlock between planters does not effect, or cover the planting regions, exposed to either side thereof.

The particular interlocking system used in the preferred embodiments of the present invention is a rotational male/female interlock. As will be seen in FIG. 3, in order to provide the interlocking, the two planters are initially placed in alignment with one another, as shown in solid lines. This puts them in a position to provide a twist fitting of the lower to the upper planter. It will be noted that the bottom end of each planter is recessed to allow its fitting into the mouth at the upper end of a lower planter. Upon twisting of two planters relative to one another, the upper undercut portion 5 of the lower planter rides over and locks onto the protruding rib 13, at the bottom edge of the upper planter. Each of the ribs 13 includes a rounded end 14 for easing of the fitting of the ribs into the undercut portions at either side of the interlocked planters. When in the interlocked position, as again best seen in FIG. 1, lugs 15 fit immediately outside of the engaged rib and undercut portions to prevent any spreading and releasing of the male/female locking components.

Figure 4:
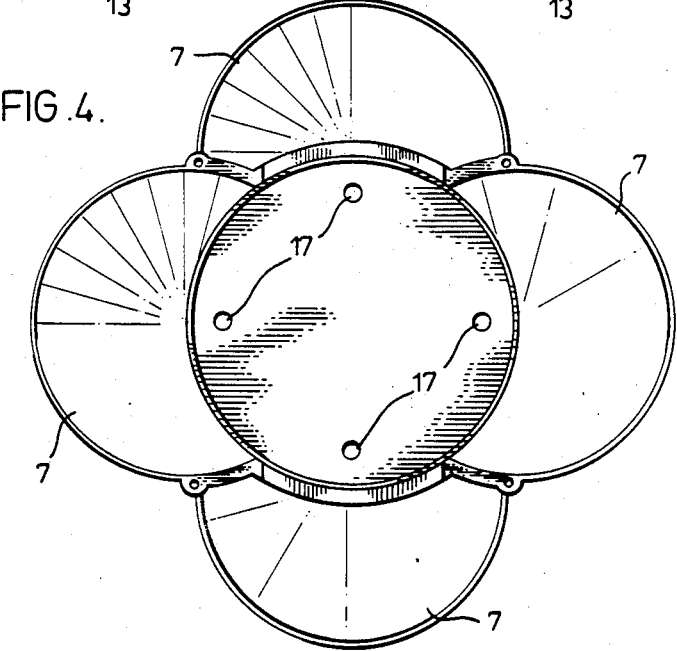
FIG. 4 is a top plan view of the arrangement of FIG. 1.

It will be further seen in FIG. 1 that in the stacked interlocked position, not only are all of the planting regions 7 fully exposed at each of the individual planters, but in addition, the planting regions of the individual planters are located at 90 degree intervals so that the planting regions are located all the way around the planter as seen in FIG. 4, relative to one another. Therefore, when the planting regions are filled, there is, in effect, a full foliage cover around the planter hiding the planter body and providing a uniform appearance to the overall planter arrangement.

Figure 5:
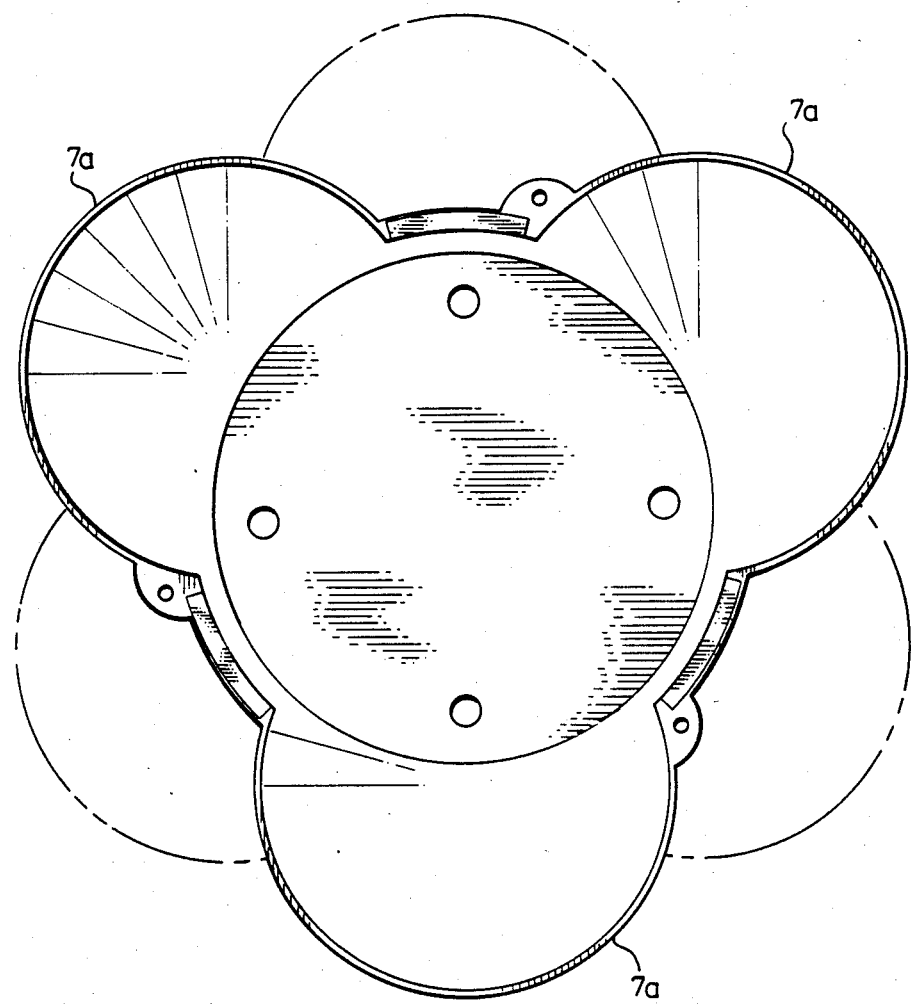
FIG. 5 is a top plan view of a planter arrangement according to a further preferred embodiment of the present invention.
Figure 6:
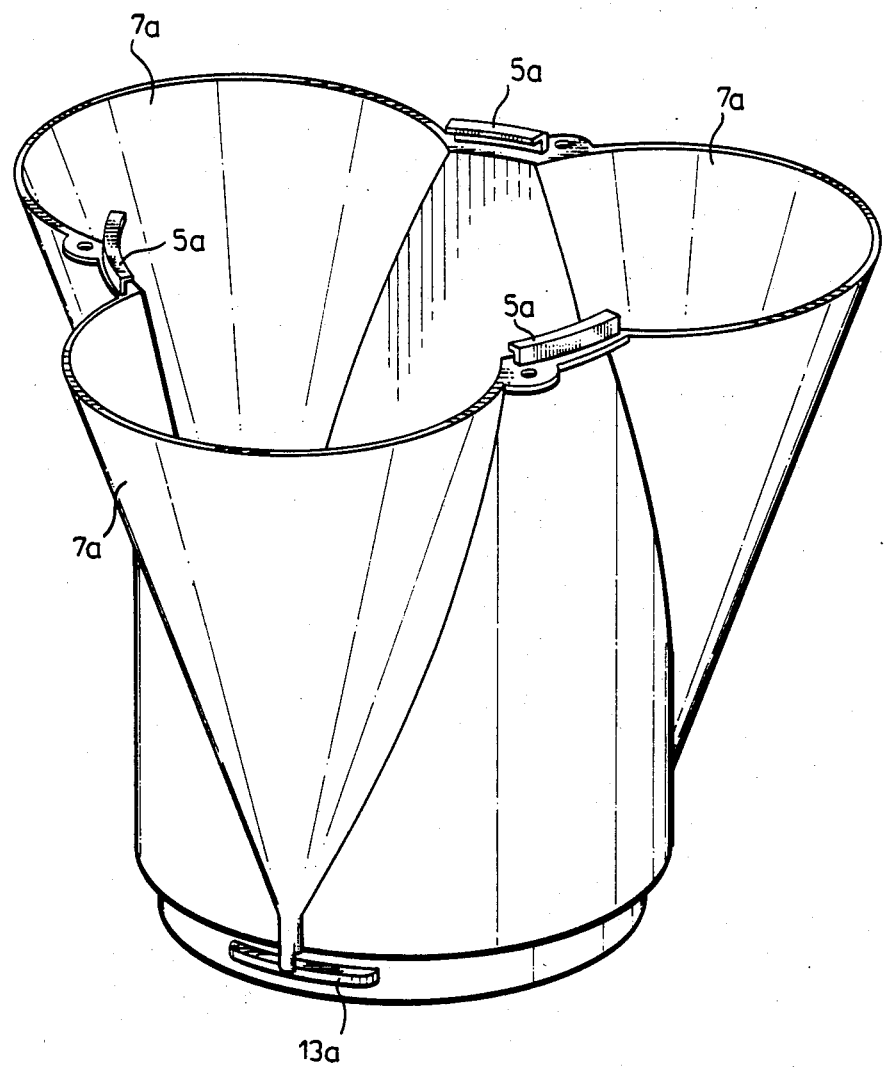
FIG. 6 is a top perspective view of one of the planters shown in the FIG. 5 arrangement.

The description above relates specifically to planters including two diametrically opposed planting regions, separated by two interlocking portions. FIGS. 5 and 6 show a modification to this arrangement in which each individual planter is provided with three planting regions 7A, symetrically placed around the periphery of the planter. In this arrangement there are three undercut regions 5A at the upper edge of each planter, one between each of the planting regions. For interlocking purposes, each individual planter is further provided with three ribs 13A around its lower edge, immediately below each of the planter regions and circumferentially spaced, or offset, from the undercut portion at the top end of each planter. Accordingly, the interlocking action is exactly the same as described with respect to FIGS. 1 through 4, except that there are three, as opposed to two, interlocking positions. In addition, the FIG. 5 arrangement, including two vertically stacked planters, will have, in effect, six planting regions around its periphery to provide an extremely full coverage, for purposes of hiding the planter bodies in the stacked arrangement.

It will now be understood from the description above, how a very effective, yet simple vertically stacking and interlocking planter arrangement can be provided in accordance with the present invention. Furthermore, although the drawings show only two planters interlocked with one another at any one time, it is to be appreciated that the interlocking and stacking feature can be extended to any desired number of planters, depending upon the amount of planting space that is required.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A hanging planting arrangement including at least first and second like and vertically stacking interlocking planters, each planter comprising a lower end provided with a first interlock component and an upper end provided with both at least one planting region and a second interlock component remote from said planting region circumferentially offset from said first interlock component and complimentary therewith to form an interlock between the upper end of one of said planters and the lower end of the other of said planters, each of which is interchangeable in up and down position above and below one another with the interlock therebetween providing all support for the planter in the down position.

2. A hanging planting arrangement as claimed in claim 1 wherein said first interlock component comprises a laterally extending rib and an axially extending lug gapped outwardly from said rib, and said second interlock component comprises an undercut body portion, the undercut body portion on the planter in the down position interlocking with the rib on the planter in the up position with the lug preventing spreading of the undercut body portion off of the rib.

3. A hanging planting arrangement as claimed in claim 1 having a plurality of planting regions with a second interlock component between each of said planting regions, and a first interlock component immediately beneath each planting region.

4. A hanging planting arrangement as claimed in claim 2 wherein each rib has rounded ends for easing into the undercut body portion into which each rib is fitted.

5. A hanging planting arrangement as claimed in claim 2 wherein the lower end is of decreased diameter relative to the upper end on each planter for fitting the lower end on the planter in the up position into the upper end of the planter in the down position to align and twist fit the rib on the planter in the up position into the undercut body portion of the planter in the down position.

6. A hanging planter arrangement as claimed in claim 1 wherein each of said first and second planters includes integral eyelets for suspending said planting arrangement in a hanging mode, regardless of which planter is in the up position, with the interlock therebetween supporting the planter in the down position.

* * * * *